June 30, 1931. J. H. N. PELKMAN 1,811,962
TRAVELING OVEN
Filed March 25, 1926 2 Sheets-Sheet 1

INVENTOR
Johannes Hermanus Nicolaas Pelkman
BY
Gill + Jennings
ATTORNEYS

June 30, 1931. J. H. N. PELKMAN 1,811,962
TRAVELING OVEN
Filed March 25, 1926 2 Sheets-Sheet 2

INVENTOR
Johannes Hermanus Nicolant Pelkman
BY
Gill & Jennings
ATTORNEYS

Patented June 30, 1931

1,811,962

UNITED STATES PATENT OFFICE

JOHANNES HERMANUS NIEULANT PELKMAN, OF LONDON, ENGLAND, ASSIGNOR TO NAAMLOOZE VENNOOTSCHAP BAKOVENBOUW VOORHEEN H. P. DEN BOER, OF DORDRECHT, NETHERLANDS

TRAVELING OVEN

Application filed March 25, 1926, Serial No. 97,344, and in Great Britain November 19, 1925.

This invention relates to baking ovens for baking bread and the like in tins which are carried through the oven on endless conveyors, and has for its object to construct an oven and prover as a single unit.

According to the present invention a chamber is divided into compartments one of which serves as the oven whilst the other compartment serves as a prover. The compartments are superposed, the prover being either above the oven or underneath the oven. The prover may be heated by the heat dissipated from the tins from which the baked products have been discharged. For this purpose, the tins, from which the baked products have been discharged, are conducted through the prover, whilst the tins containing the material to be proved are conducted between the empty tins and the oven. For the purpose of varying the temperature of the prover suitable means may be provided such as burners or hot or cold air may be admitted thereto or by heating or cooling pipes.

The invention will now be described with reference to the accompanying drawings wherein:—

Figure 1:
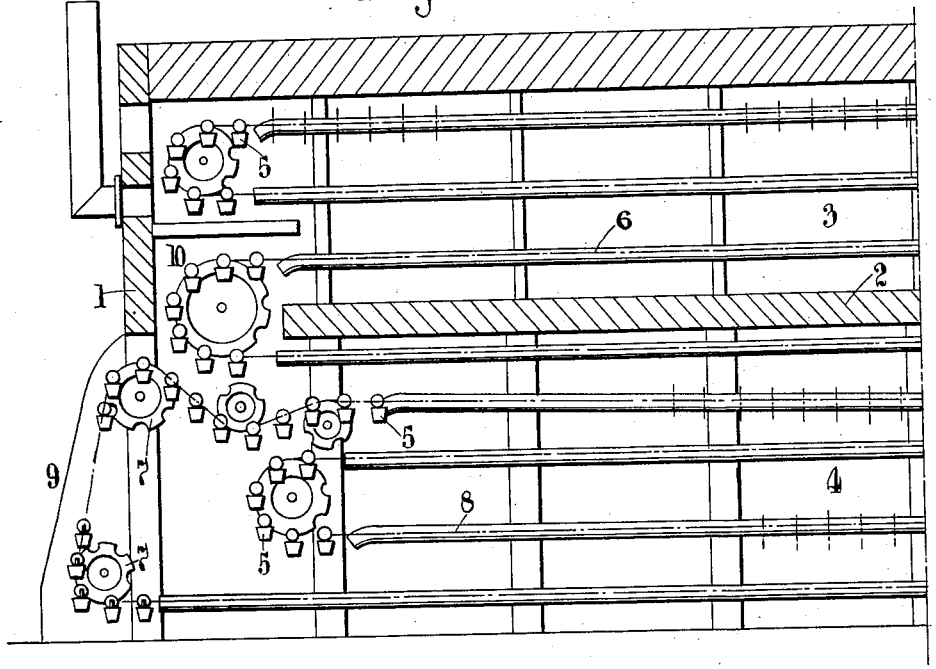
Figure 1 shows one form of construction in longitudinal section.

Referring first to Figure 1 a chamber construction is divided by a partition 2 into two compartments 3 and 4. The compartment 3 constitutes the baking oven which is heated in any well known manner. The compartment 4 constitutes the prover.

The tins 5 are conveyed by endless conveyors 6 through the prover 4 and oven 3. The conveyors 6 are guided by guide wheels 7 and by tracks 8, or by guide wheels if desired which are located inside the prover 4 and the oven 3. The passage of the tins through the prover 4 and oven 3 is indicated by the arrows. The tins 5 are charged by hand, or otherwise at 9 and are then passed through the prover 4 in the direction indicated by the arrows and then pass into the oven at 10. As will be seen from the drawing the tins are passed along the whole length of the prover and then back again one or more times to the passage 10 leading into the oven, and then they are passed a number of times along the whole length of the oven until they pass out of the oven at 11. The tins are then discharged at 12 and the empty tins which are still hot then return into the prover along the path indicated by the arrows so as to impart their heat to the prover for the purpose of heating the material to be proved. After the empty tins have passed through the prover they against reach the charging position 9.

Figure 2:
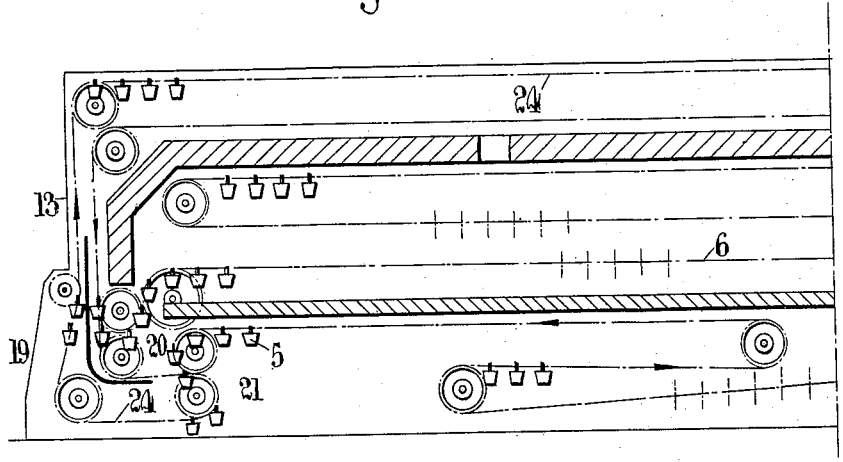
Figure 2 shows a second form of construction.
Figure 1:
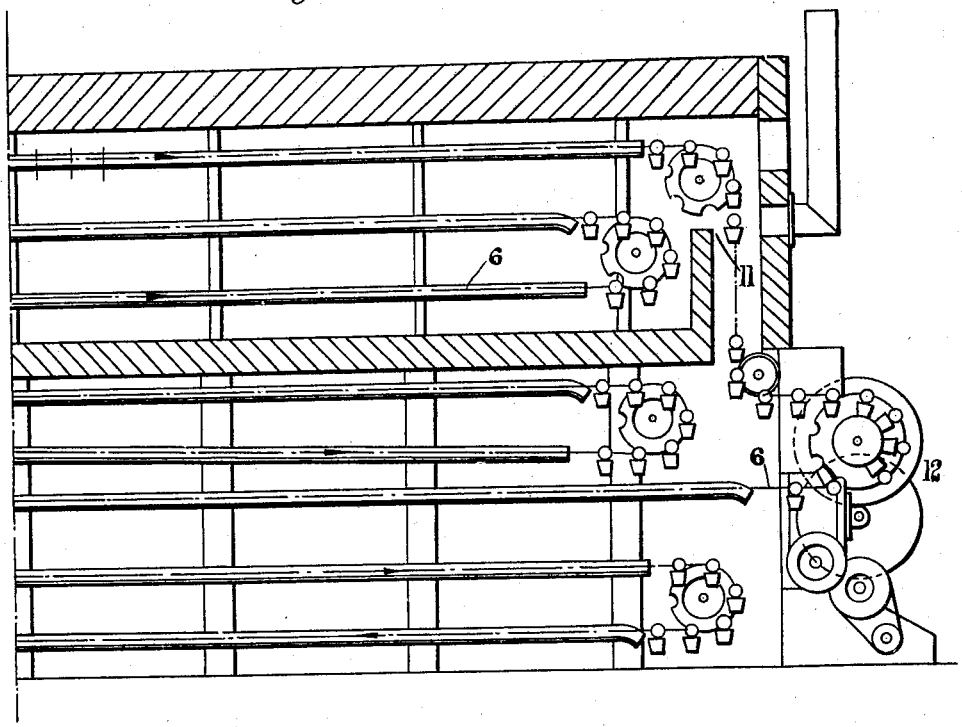
Figure 2:
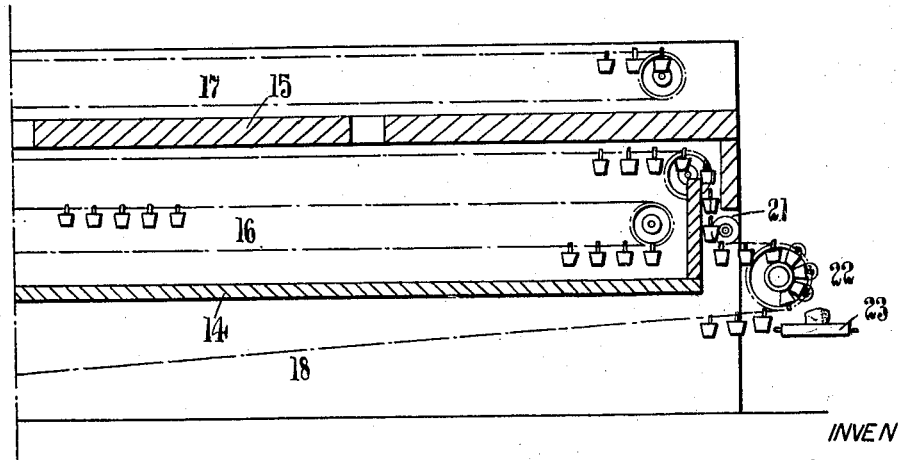

Referring now to Figure 2 the chamber structure 13 is divided by partitions 14 and 15 into an oven 16, a prover 17 and a passage 18 for the return of the empty tins. In this arrangement the prover is heated by the heat from the oven 16, but it will be understood that it could also be heated by means of the heat from the empty tins by passing these first through the prover before passing them through the chamber 18 or in any other suitable manner.

In this construction also the tins 5 are conveyed by endless conveyors 6 through the various chambers, the conveyors being guided in the chambers in the same manner as described in connection with Figure 1.

In Figure 2 the tins are supplied with the material to be baked at 19 and then pass backwards and forwards on a conveyor 24 through the prover 17 and at 20 are transferred by suitable transfer mechanism, on to the conveyor 6 which passes through the oven 16. The baked products leave the oven at 21 and the tins are discharged as shown diagrammatically at 22 preferably on to a conveyor band 23. The empty tins then pass through the chamber 18 and are transferred at 21 by means of suitable transferring mechanism, to the conveyor 24 so as to be again recharged at 19.

It will however be understood that in the construction shown in Figure 1 I may use a number of conveyors and suitable transfer mechanism between the separate conveyors for the purpose of transferring the tins from one conveyor to another, as described in connection with Figure 2, whilst in Figure 2 an endless conveyor may be used for conducting the tins through the prover and oven.

For the purpose of varying or adjusting the temperature in the prover the prover may be heated by burners or hot or cold air may be admitted thereto, or it may be provided with heating or cooling pipes. For this purpose it is also possible to use the heat of the hot gases in the oven for heating the prover, the hot gases being drawn from the oven and through the prover by suitable suction or compression devices.

Having thus described my invention what I claim as new and desire to secure by Letters Patent is:—

1. A baking oven comprising a unitary chamber structure, a horizontal partition which divides said structure into two horizontal compartments, said partition having at one end an upstanding wall which is parallel with the adjacent outer wall, the opposite end wall of the oven having on substantially the same plane an inwardly extending and horizontal wall, the lower compartment forming a prover and the other a baking oven, conveying means for receptacles into which the products to be baked are charged at the forward end of the structure, being then conducted backwards and forwards in said prover and then into the forward end of the baking oven in which they are moved backwards and forwards and again backwards to the rear end of the structure.

2. In a baking oven, a prover chamber located below a baking chamber and in communication therewith, one end of the oven constituting a charging end, the discharge end being opposite and on the same plane as the charging end, an intermediate partition having adjacent to the discharge end of the oven an upstanding wall, the opposite end wall of the furnace having on the same plane a horizontal and inwardly extending wall, a single flexible conveyer for dough receptacles, guides for the conveyer positioned to effect after passing the discharge a return travel of the receptacles to the charging end of the structure, means in the proofing chamber arranged to guide the conveyer in a series of horizontal paths through the proofing chamber and thence upward into the baking chamber adjacent its forward end, and similar means in the baking chamber to guide the conveyer in a series of horizontal paths and thence downward into the proofing chamber at its discharge end.

3. A baking oven, a structure which is divided by a horizontal partition of less length than the distance between the end walls of the furnace to constitute an oven and a prover, said partition having near the discharge end a transverse and upstanding end wall, a cross wall which extends from the inner side of the oven wall on the same plane as the upper end of said cross wall, a single conveyer for both the prover and the oven, guides for the conveyer which effect travel of the same in circuitous courses in and beyond the oven and prover.

4. A baking oven comprising a structure which is divided longitudinally by a horizontal partition which has an upstanding end, a horizontal cross wall on the opposite inner end of the oven and on the same plane as the upper portion of the upstanding end of the partition to provide a prover chamber into and through which a conveyer is guided to move from the discharge end of the structure in a circuitous course toward the charging end of the structure and from thence in a higher circuitous course from the prover into the oven and from the oven downward to the discharge end of the structure.

J. H. NIEULANT PELKMAN.